United States Patent [19]

Blake et al.

[11] 4,075,970
[45] Feb. 28, 1978

[54] SPEED SELECTION FOR A DIRECT CURRENT PERMANENT MAGNET MOTOR

[75] Inventors: Charles H. Blake, Park City; Donald H. Wood, Gurnee, both of Ill.

[73] Assignee: Outboard Marine Corporation, Waukegan, Ill.

[21] Appl. No.: 671,019

[22] Filed: Mar. 26, 1976

Related U.S. Application Data

[62] Division of Ser. No. 504,353, Sept. 9, 1974, abandoned.

[51] Int. Cl.² .............................................. B63H 21/26
[52] U.S. Cl. .................................... 115/18 E; 310/87; 318/139; 318/349
[58] Field of Search ..................... 115/18 E, 18 R, 17; 310/87; 318/348, 349, 440, 139, 411, 412

[56] References Cited

U.S. PATENT DOCUMENTS

| | | | |
|---|---|---|---|
| 2,429,774 | 10/1947 | Schultz et al. | 115/18 E |
| 2,786,173 | 3/1957 | Martin et al. | 318/348 |
| 2,808,238 | 10/1957 | Spitler | 310/87 X |
| 2,975,349 | 3/1961 | Green | 318/345 B X |
| 3,196,301 | 7/1965 | Turk | 310/87 X |
| 3,387,194 | 6/1968 | Banks | 318/139 |
| 3,593,050 | 7/1971 | Ware | 115/18 E X |
| 3,906,887 | 9/1975 | Kappas | 115/18 E |
| 3,954,081 | 5/1976 | Blake | 115/18 E |

*Primary Examiner*—Trygve M. Blix
*Assistant Examiner*—Sherman D. Basinger
*Attorney, Agent, or Firm*—Michael, Best & Friedrich

[57] ABSTRACT

Disclosed herein is a outboard motor comprising a shaft extending vertically under normal operating conditions and including a hollow interior, a lower housing fixedly connected to the shaft and including a hollow interior, an electric motor mounted in the housing hollow interior and including an output shaft, a propeller driven by the output shaft, a resistor electrically connected to the motor and located in spaced relation axially of the output shaft from the adjacent end of the electric motor, and a thermally conductive agent fixedly bonding the resistor to the housing. Also disclosed herein is a speed control circuit for a permanent magnet, direct current motor comprising a speed control including a first resistor connected between one of the armature winding terminals of the motor and a direct current source, a second resistor connected to the one armature winding terminal, a shunt lead connected to the one armature winding terminal, and a switch connected to the direct current source in parallel with the first resistor and selectively operable between a first position connecting the direct current source to the shunt lead, a second position connecting the direct current source to the second resistor, and a third position disconnected from both of the shunt lead and the second resistor, whereby current flow from the current source to the armature is solely through the first resistor.

10 Claims, 3 Drawing Figures

SPEED SELECTION FOR A DIRECT CURRENT PERMANENT MAGNET MOTOR

RELATED APPLICATION

Attention is directed to copending application Ser. No. 399,609, filed Sept. 21, 1973 by Charles H. Blake and entitled "Speed Regulator for DC Permananet Magnet Motor" now abandoned. This application is a division of application Ser. No. 504,353 filed Sept. 9, 1974 and now abandoned.

BACKGROUND OF THE INVENTION

The invention relates generally to outboard motors and more particularly to outboard motors including electric motors. Still further, the invention relates to speed control circuits for outboard motors driven by permanent magnet electric motors.

The invention also relates to the control of direct current permanent magnet motors.

Attention is directed to the Ware U.S. Pat. No. 3,593,050 issued July 13, 1971 and to the Green U.S. Pat. No. 2,975,349 issued Mar. 14, 1961.

SUMMARY OF THE INVENTION

The invention provides an outboard motor comprising a shaft extending vertically under normal operating conditions and including a hollow interior, means connected to the shaft for mounting the shaft to a boat hull, a lower housing fixedly connected to the shaft and including a hollow interior, an electric motor mounted in the housing hollow interior and including an output shaft, a propeller driven by the output shaft, a resistor electrically connected to the motor and located in the housing hollow interior in spaced relation axially of the output shaft from the adjacent end of the electric motor, and a thermally conductive means fixedly bonding the resistor to the housing.

In accordance with a preferred embodiment of the invention, the thermally conductive means comprisies an epoxy cement and the resistor is embedded in the cement with the resistor and the cement being in spaced relation from the adjacent end of the electric motor so as thereby to provide an air space therebetween.

The invention also provides an outboard motor comprising a shaft extending vertically under normal operating conditions and including a hollow interior, together with a lower housing fixedly connected to the shaft and including a hollow interior including first and second chambers separated by a partition, an electric motor mounted in the first housing chamber and including an output shaft, a propeller driven by the output shaft, a resistor electrically connected to the motor and located in the second housing chamber, and a thermally conductive means fixedly bonding the resistor to the housing.

In accordance with a preferred embodiment of the invention, the lower housing includes an adapter housing member including the second chamber and a motor housing member connected to the adapter housing member and including the first chamber and the partition.

Also in accordance with a preferred embodiment of the invention, the chamber in the adapter housing is closed by the partition.

Also in accordance with a preferred embodiment of the invention, the thermally conductive means comprises an epoxy cement and the resistor is embedded in the cement with the resistor and the cement in spaced relation from the partition so as thereby to provide an air space therebetween.

The invention further provides a speed control circuit for a permanent magnet, direct current motor comprising a speed means including a first resistor connected between one of the terminals of the armature winding and a direct current source, a second resistor connected to the one armature winding terminal, a shunt lead connected to the one armature winding terminal, and a switch connected to the direct current source in parallel with the first resistor and selectively operable between a first position connecting the direct current source to the shunt lead, a second position connecting the direct current source to the second resistor, and a third position disconnected from both of the shunt lead and the second resistor, whereby current flow from the current source to the armature is solely through the first resistor.

In accordance with a preferred embodiment of the invention, the direct current source comprises a first battery having positive and negative terminals and a second battery connected to one of the first battery terminals in series with the first battery and further including a battery control switch connected to the motor and operative selectively between a first position connecting the armature winding to one of the first battery terminals and a second position connecting the armature winding to the other of the first battery terminals.

Also in accordance with a preferred embodiment of the invention, there is also provided a reversing switch connected between the direct current source and the armature winding and operative selectively between a first position connecting the armature winding to the direct current source for energizing of the motor in one rotative direction and a second position connecting the armature winding to the direct current source for energizing of the motor in the opposite rotative direction.

One of the principal features of the invention is the provision of an outboard motor which includes a permanent magnet electric motor and a speed control circuit affording variation in the voltage applied to the electric motor.

Another of the principal features of the invention is the provision of an outboard motor which includes a permanent magnet electric motor and a speed control circuit affording change in the direction of rotation of the electric motor.

Another of the principal features of the invention is the provision of an outboard motor which includes a permanent magnet electric motor and a speed control circuit including means selectively connecting the motor to one or more batteries.

Still another of the principal features of the invention is the provision of an outboard motor which includes a permanent magnet electric motor and a speed control circuit including one or more resistors located in an underwater housing in spaced relation from the electric motor and separated from the electric motor by a partition extending in spaced relation from the resistor or resistors and between the resistor or resistors and the electric motor.

Still another of the principal features of the invention is the provision of an outboard motor which includes a permanent magnet electric motor and a speed control circuit including one or more resistors located in an underwater housing in spaced relation axially from one end of the electric motor and separated from the motor by an air space.

Another of the principal features of the invention is the provision of a speed control circuit for a permanent magnet electric motor, which circuit affords variation in voltage applied to the electric motor and/or for reversal of the direction of rotation of the electric motor.

Other features and advantages of the invention will become known by reference to the following drawings, general description, and claims.

THE DRAWINGS

Figure 1:
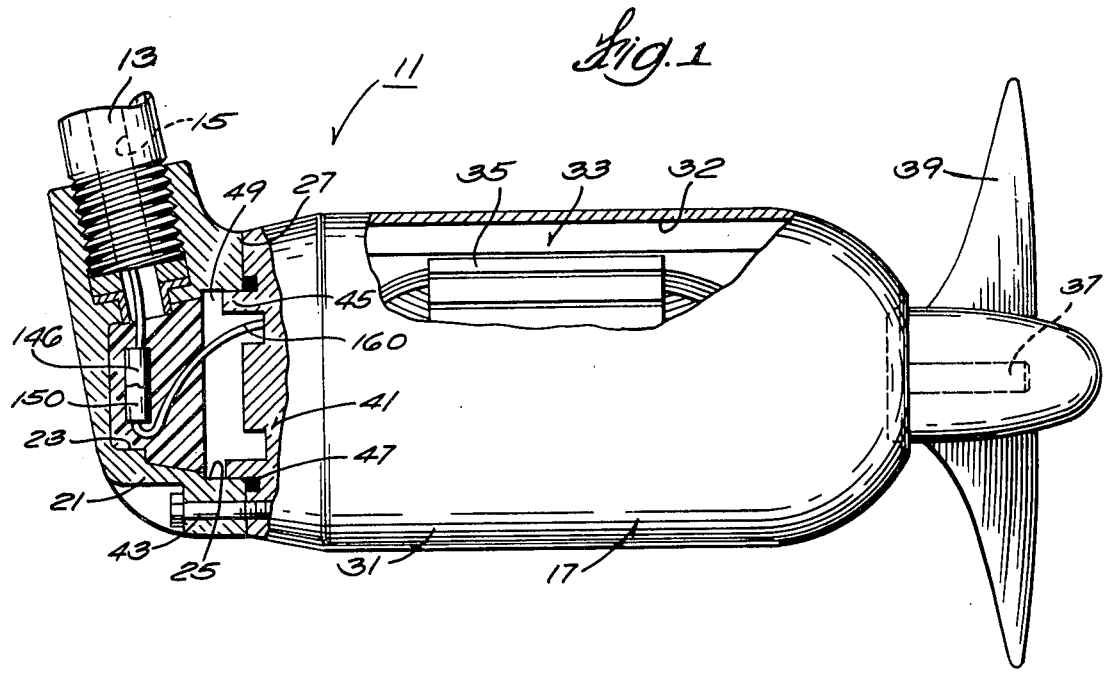
FIG. 1 is a fragmentary side elevational view, partially broken away and in section, of an outboard motor embodying various of the features of the invention.

Before explaining the invention in detail, it is to be understood that the invetnion is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for purpose of description and should not be regarded as limiting.

GENERAL DESCRIPTION

Shown in FIG. 1 of the drawings is an outboard motor 11 which includes a shaft 13 having a hollow interior 15 and which is carried for steering movement about an axis extending lengthwise of the shaft 13 under normal operating conditions and for tilting movement about a horizontal axis by any suitable means such as disclosed in the Shimanckas U.S. application, Ser. No. 381,602 filed July 23, 1973, and incorporated herein by reference.

At its lower end, the shaft 13 is suitably connected, as by a screw thread connection or otherwise, to an underwater housing 17 which includes an adapter housing member 21 having a rearwardly open cavity or recess 23 communicating with the hollow interior 15 of the shaft 13. The recess 23 includes a rearwardly open counterbore 25 and the adapter housing member 21 includes a rearwardly facing surface 27 extending from the outer or rearward end of the counterbore 25.

Connected to the rearward surface 27 of the adapter housing member 21 is a motor housing member 31 including a hollow interior cavity or chamber 32 which contains and supports a direct current motor 33 including an armature winding 35 and an output shaft 37 which can extend rearwardly from the motor housing member 31 and can have a propeller 39 mounted thereon for rotation in common with the output shaft 37. The motor housing member 31 also includes, forwardly of the electric motor 33, a transverse wall or partition 41 which separates the recess 23 from the cavity 32. The motor housing member 31 can be connected to the adapter housing member 21 in any suitable fashion, and, in the disclosed construction, is connected by a plurality of bolts 43 which extend through portions of the adapter housing member 21 and are threaded into the motor housing member 31.

The counterbore 25 serves as a pilot and, preferably, the motor housing member 31 includes a pilot projection 45 which is received in the pilot counterbore 25 to properly locate the motor housing member 31 relative to the adapter housing member 21. A seal 47 in the form of an O-ring is also provided to prevent entry of water into the adapter recess or cavity 23 or into the chamber or cavity 32 of the motor housing member 31. Contained in the adapter recess or cavity 23 is a portion of a motor control circuit such as shown in FIGS. 2 or 3.

Figure 2:
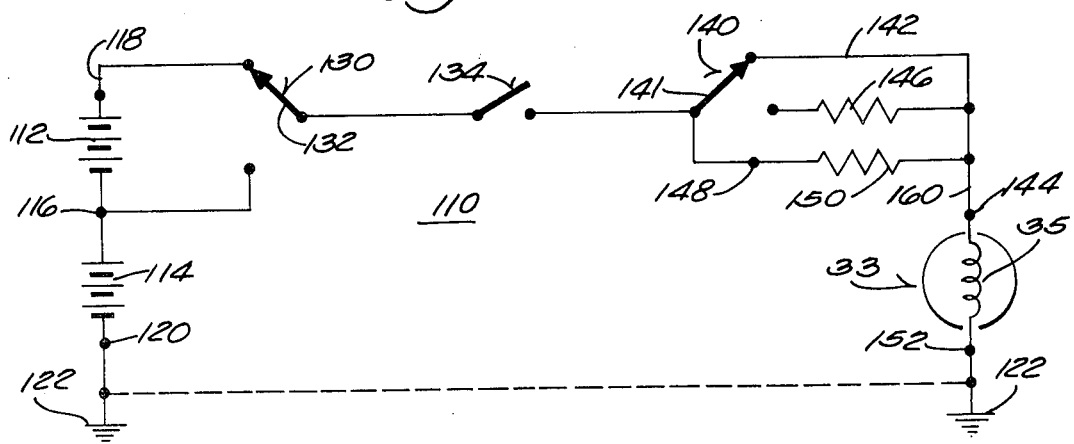
FIG. 2 is a schematic wiring diagram of one speed control circuit embodying various of the features of the invention.
Figure 3:
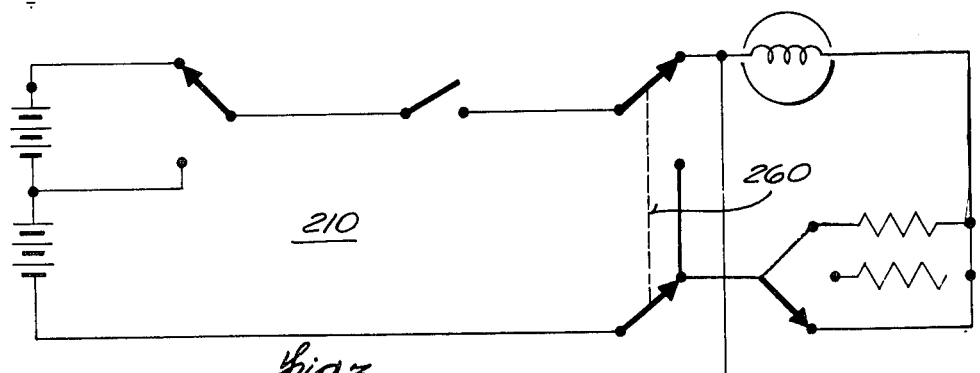
FIG. 3 is a schematic wiring diagram of another speed control circuit embodying various of the features of the invention.

Shown in FIG. 2 is one embodiment of a motor control circuit 110 adapted to provide either 12 or 24 volt potential and including a pair of serially connected 12 volt batteries 112 or 114 having a mutually connected intermediate terminal 116, a positive terminal 118 and a negative terminal 120 connected to ground 122. Included in the circuit 110 is a battery control switch 130 having a contact or member 132 which is movable between two spaced positions and which is alternatively connectable to the positive terminal 118 and to the intermediate terminal 116 of the series connected batteries 112 and 114. Thus, when the contact 132 is connected with positive terminal 118, 24 volt potential is available. When the contact 132 is connected with intermediate terminal 116, 12 volt potential is available.

The battery control switch 130 is electrically connected, through an off-on switch 134 which can be an ignition switch or a foot switch, to a motor control switch 140 which, in conjunction with the battery control switch 130, controls the voltage applied to the terminals of the armature winding 35 in the motor 33.

The motor control switch 140 includes a movable contact or member 141 adapted to be selectively coupled to a shunt lead 142 connected to one motor terminal 144, and to a resistor 146 which is connected in parallel with the shunt lead 142 to the motor terminal 144, and to a terminal 148 which is connected to the off-on switch 134 in parallel with the motor control switch 140 and to a shunt resistor 150 which is connected to the motor terminal 144. The other motor terminal 152 is connected to ground 122. If desired, a lead 154 (shown in dotted out line) can be employed between the motor terminal 152 and the negative battery terminal 120 to provided a closed circuit configuration.

Thus, when the motor control switch 140 is connected to the shunt lead 142, the motor 33 is subject to the potential provided by the battery control switch 130. When the motor control switch 140 is connected to the resistor 146, the motor 33 is subject to the potential provided by the battery control switch 130 modified by the voltage drop occurring in response to the parallel connection of the resistors 146 and 150. When the motor control switch 140 is connected to the terminal 148, the motor is subject to the potential provided by the battery control switch 130 modified by the voltage drop occurring across the resistor 150. Thus, the motor control switch 140 provides for motor operation at six different voltages, i.e., at three different voltage levels for each position of the battery control switch 130. If desired, the motor control switch 140 could be arranged so as to locate the switch in an electrically unconnected position with the same result as connected to the terminal 148.

If desired, additional resistors could be arranged for selective connection by the motor control switch 140 to provide motor operation at additional potentials.

While the motor control switch is illustrated in FIG. 2 as being connected to the positive battery terminal 118, the circuit 110 could be rearranged so that the motor control switch 140 and resistor 150 are connected to the negative battery terminal 120 in a closed circuit configuration.

Shown in FIG. 3 is another motor control circuit 210 which is essentially the same as the circuit 110 shown in FIG. 2, except that the circuit 210 is closed and except that an additional double throw reversing switch 260 is employed to afford reversal in the application of current to the motor 33 so as to provide for forward and reverse operation.

The resistors 146 and 150 are preferably located in the recess or cavity 23 in the housing adapter member 21 and are fixed therein by being embedded in a thermally conductive agent, such as an epoxy cement, which serves to bond the resistors 146 and 150 to the adapter housing member 21, while at the same time, providing for high heat transfer from the resistors 146 and 150 to the adapter housing member 21 and while also electrically insulating the resistors 146 and 150 from the housing adapter member 21. It is noted especially that the heat generated by the resistors 146 and 150 is dissipated to the water through the adapter housing member 21 independently of the motor housing member 31 and that the resistors 146 and 150 are spaced from the partition 41 provided by the motor housing member 31 and from the motor 33 located on the other side of the partition 41 by an air space or void 49 which also acts to thermally insulate the motor 33 from the heat generated by the resistors 146 and 150.

The resistors 146 and 150 are connected to the armature winding 35 by a lead 160 which extends through the partition 41 in an aperture (not shown) which is sealed by a grommet (not shown) or epoxy cement, or otherwise.

Various of the features of the invention are set forth in the following claims.

What is claimed is:

1. An outboard motor comprising a shaft extending vertically under normal operating conditions and adapted to be connected to a boat hull, said shaft including a hollow interior, a lower housing fixedly connected to said shaft and including a hollow interior communicating with said hollow interior of said shaft, a permanent magnet, direct current electric motor including an armature winding having opposed terminals, said motor being mounted in said housing hollow interior and further including an output shaft including a first end extending exteriorly of said lower housing and a second end terminating within said hollow interior of said lower housing, a propeller mounted on said first end of said output shaft, a control circuit for said motor including a first resistor connected to one of said armature winding terminals and adapted for connection to a direct current source, a second resistor connected to said one armature winding terminal, a shunt lead connected to said one armature winding terminal, and a switch adapted for connection to the direct current source in parallel with said first resistor and selectively operable between a first position for connecting the direct current source to said shunt lead, a second position for connecting said direct current source to said second resistor, and a third position disconnected from both of said shunt lead and said second resistor, whereby to permit current flow from the current source to said armature solely through said first resistor, at least one of said resistors being located in said housing hollow interior in axially spaced relation from said output shaft, and a thermally conductive means fixedly bonding said resistor to said housing.

2. An outboard motor in accordance with claim 1 and further including a source of direct current.

3. An outboard motor in accordance with claim 2 wherein said switch and said second resistor are connected to said direct current source through an off-on switch.

4. An outboard motor in accordance with claim 2 wherein said direct current source comprises a first battery having positive and negative terminals, and a second battery connected to one of said first battery terminals in series with said first battery and further including a battery control switch connected to said motor and operative selectively between a first position connecting said armature winding to one of said first battery terminals and a second position connecting said armature winding to the other of said first battery terminals.

5. A speed control circuit in accordance with claim 2 and further including a reversing switch connected between said direct current source and said armature winding and operative selectively between a first position connecting said armature winding to said direct current source for energizing of said motor in one rotative direction and a second position connecting said armature winding to said direct current source for energizing of said motor in the opposite rotative direction.

6. an outboard motor in accordance with claim 2 wherein said control circuit further includes a reversing switch connected between said direct current source and said armature winding and operative selectively between a first position connecting said armature winding to said direct current source for energizing of said motor in one rotative direction and a second position connecting said armature winding to said direct current source for energizing of said motor in the opposite rotative direction.

7. An outboard motor in accordance with claim 6 wherein said reversing switch and said second resistor are connected to said direct current source through an off-on switch.

8. A marine propulsion installation including a direct current source and an outboard motor comprising a shaft extending vertically under normal operating conditions and adapted to be connected to a boat hull, said shaft including a hollow interior, a lower housing fixedly connected to said shaft and including a hollow interior communicating with said hollow interior of said shaft, a permanent magnet direct current electric motor including an armature winding having opposed terminals, said motor being mounted in said housing interior and further including an output shaft including a first end extending exteriorly of said lower housing and a second end terminating within said hollow interior of said lower housing, a propeller mounted on said first end of said output shaft, a control circuit for said motor including a first resistor connected between one of said armature winding terminals and said direct current souce, a second resistor connected to one of said one armature winding terminal and said direct current source, a shunt lead connected to said one of said one armature winding terminal and said direct current source, and a switch connected to the other of said one armature winding terminal and said direct current source in parallel with said first resistor and selectively operable between a first position connecting said other of said one armature winding terminal and said direct current source to said shunt lead, a second position connecting said other of said one armature winding terminal and said direct current source to said second resistor, and a third position disconnected from both of said shunt lead and said second resistor, whereby current flow from said current source to said armature winding is solely through said first resistor, at least one of said resistors being located in said housing hollow interior in axially spaced relation from said output shaft, and a thermally conductive means fixedly bonding said one resistor to said housing.

9. A marine propulsion installation in accordance with claim 8 wherein said switch and said second resistor are connected between said direct current source and said one armature winding terminal through an off-on switch.

10. A marine propulsion installation in accordance with claim 8 wherein said control circuit further includes a reversing switch connected between said direct current source and said armature winding and operative selectively between a first position connecting said armature winding to said direct current source for energizing of said motor in one rotative direction and a second position connecting said armature winding to said direct current source for energizing of said motor in the opposite rotative direction.

* * * * *

UNITED STATES PATENT AND TRADEMARK OFFICE
CERTIFICATE OF CORRECTION

PATENT NO. : 4,075,970
DATED : February 28, 1978
INVENTOR(S) : Charles H. Blake and Donald Wood It is certified that error appears in the above-identified patent and that said Letters Patent are hereby corrected as shown below:

Column 1, line 8            "Permananet" should be ---Permanent---.

Column 6, line 4            Before the word "resistor" insert the word ---one---.

Column 6, line 31           "an" should be ---An---.

Column 6, line 54           Before the word "interior" insert the word ---hollow---

Signed and Sealed this

Sixth Day of March 1979

[SEAL]

Attest:

RUTH C. MASON
*Attesting Officer*

DONALD W. BANNER
*Commissioner of Patents and Trademarks*